United States Patent [19]

Silva

[11] 3,777,050

[45] Dec. 4, 1973

[54] SHIELDING TAPE GROUNDING DEVICE FOR HIGH VOLTAGE CABLES

[75] Inventor: Frank A. Silva, Basking Ridge, N.J.

[73] Assignee: American Esna Corporation, New York, N.Y.

[22] Filed: Dec. 30, 1971

[21] Appl. No.: 214,309

Related U.S. Application Data

[63] Continuation of Ser. No. 112,146, Feb. 3, 1971, abandoned.

[52] U.S. Cl. ............... 174/78, 174/73 R, 339/14 R, 339/251
[51] Int. Cl..... H02g 15/02, H01r 3/06, H01r 11/10
[58] Field of Search.................... 174/40 CC, 73 R, 174/73 SC, 78, 91, 92, 93; 339/14 R, 14 L, 60 R, 61 R, 249 S, 251, 263 L, 265 F, 266 G

[56] References Cited
UNITED STATES PATENTS

| | | | |
|---|---|---|---|
| 2,416,063 | 2/1947 | Nicholls.......................... | 174/40 CC |
| 2,427,883 | 9/1947 | Score et al. .................... | 174/40 CC |
| 2,923,760 | 2/1960 | Famely........................... | 174/40 CC |
| 3,209,067 | 9/1965 | Channell et al................... | 174/78 X |
| 3,240,868 | 3/1966 | Ets-Hokin et al................. | 174/78 X |
| 3,243,756 | 3/1966 | Ruete et al..................... | 173/73 R X |
| 3,537,060 | 10/1970 | Tordoff............................ | 339/14 R |
| 3,542,942 | 11/1970 | Johnson et al.................... | 174/73 R |
| 3,590,138 | 6/1971 | Sugimoto et al.............. | 174/73 R X |
| 3,597,527 | 8/1971 | Lusk .............................. | 174/73 R |

FOREIGN PATENTS OR APPLICATIONS

| | | | |
|---|---|---|---|
| 1,930,655 | 12/1970 | Germany ............................. | 174/92 |

Primary Examiner—Laramie E. Askin
Attorney—Samuelson & Jacob

[57] ABSTRACT

A shielding tape grounding device which is installed on a high voltage cable of the type having a metallic shielding tape for the purpose of grounding the shielding tape, the device including a sleeve of elastomeric material, preferably electrically conductive, a corrugated band seated within the sleeve, a grounding rod connected to the band, and a clamp surrounding the sleeve and the band such that the sleeve may be slipped over the cable to place the band over a bared portion of the metallic shielding tape and the clamp may be tightened to draw the band into engagement with the tape and provide a direct connection to ground through the grounding rod.

47 Claims, 7 Drawing Figures

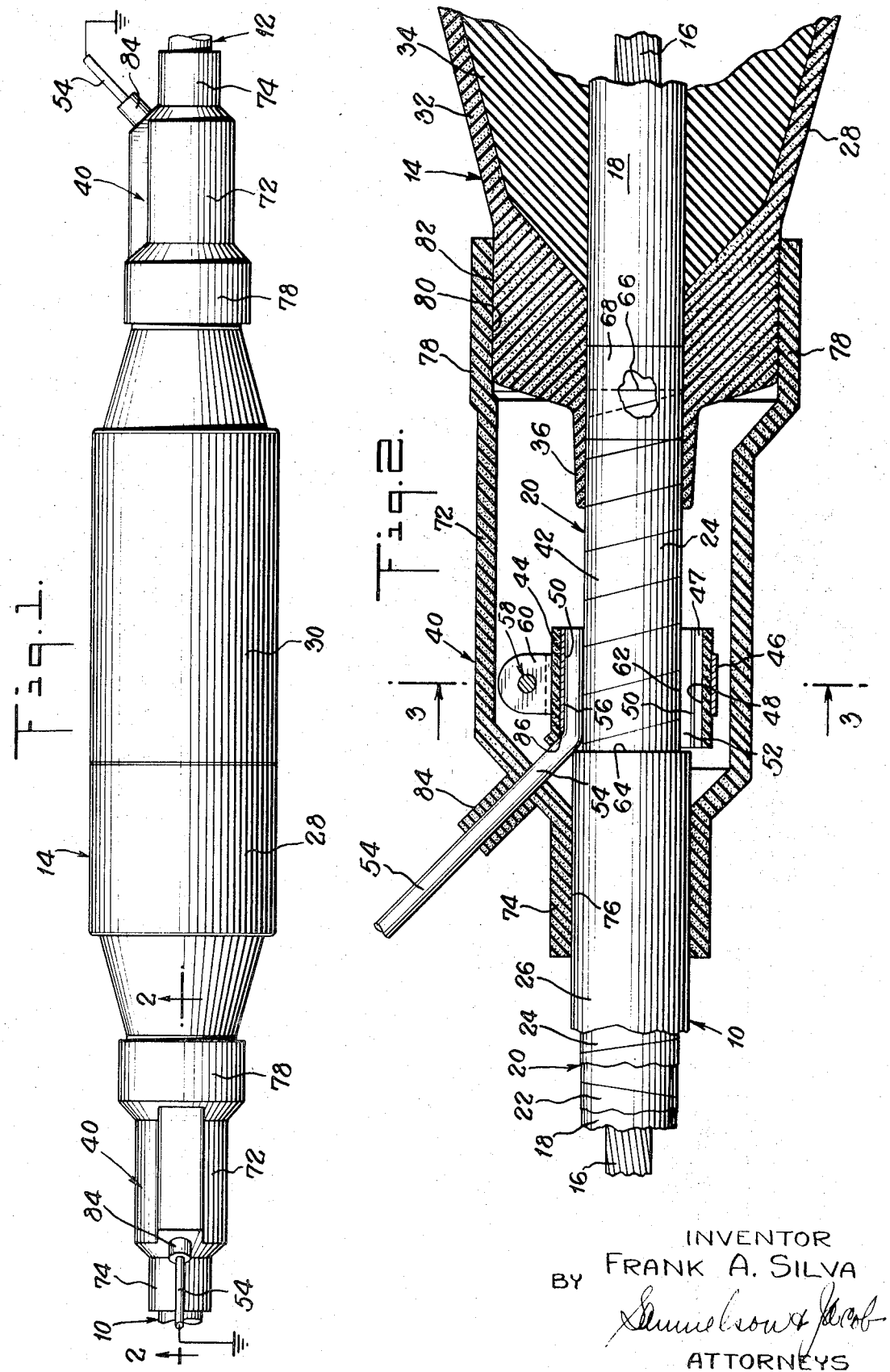

PATENTED DEC 4 1973

INVENTOR
FRANK A. SILVE
BY
*Samuelson & Jacob*
ATTORNEYS

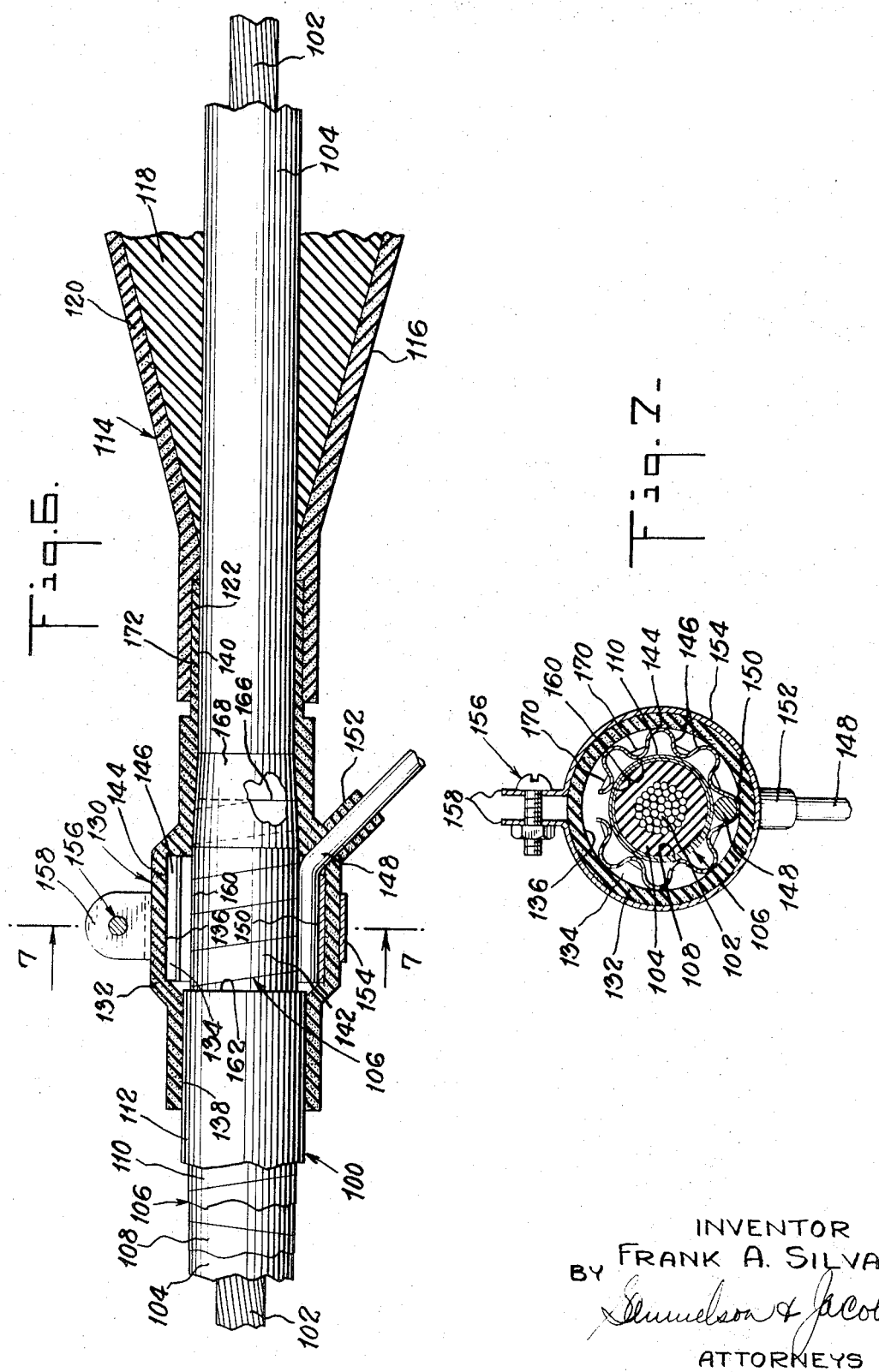

SHIELDING TAPE GROUNDING DEVICE FOR HIGH VOLTAGE CABLES

This is a Continuation of application Ser. No1 112,146 filed Feb. 3, 1971, now abandoned.

The present invention relates generally to devices for connecting or terminating shielded high voltage power cables and pertains, more specifically, to grounding devices which may be employed to facilitate termination of metallic shielding tapes in such cables and enable the utilization of currently available connectors and terminators with cables of the type employing metallic tape shields.

In recent years, heavy emphasis has been placed upon the development of underground electrical power distribution systems, especially in light industrial, commercial and residential areas. Various power distribution components, such as shielded electrical cables, transformers and electrical connectors have been evolved for use in such systems.

Among these components, shielded electrical connectors and terminators have been developed which are readily assembled in the field at the terminal ends of shielded electrical cables so as to facilitate the construction and installation of underground power distribution systems. Many of these components may be installed in the field without requiring soldering or complex taping and have met with wide acceptance.

In installations where the shielded high voltage power cables are of the type having a central conductor surrounded by an insulator which is, in turn, surrounded by a shielding system including a metallic tape shield, it is often necessary to connect the metallic tape shield to ground at prescribed locations, and especially adjacent the terminal ends of the cables where connectors or terminators are to be installed. It would be advantageous to have available a grounding device which would enable an effective connection of such a shield to ground to be accomplished with an ease of assembly similar to that enjoyed by the currently available components described above.

It is therefore an important object of the invention to provide a shielding tape grounding device which, when installed upon high voltage power cable of the type having a metallic tape shield, will effectively ground the tape shield.

Another object of the invention is to provide a grounding device of the type described above which has a current-carrying capacity of the order of magnitude of, and preferably at least as great as that of, the cable shield itself.

Still another object of the invention is to provide a grounding device of the type described above which is fabricated entirely in the factory and is easily installed in the field without soldering and without complex taping.

A further object of the invention is to provide a grounding device for facilitating the grounding of a metallic tape shield in a power cable, the grounding device having an electrical contact for making an effective ground connection with the metallic tape shield and constructed so as to accommodate various cable size ranges and dimensional variations arising out of varying thermal conditions while maintaining such an effective ground connection.

A still further object of the invention is to provide a grounding device of the type described wherein the metallic tape shield is connected to a grounding conductor, and electrical connections between the metallic tape shield and the grounding conductor are protected against corrosive elements in the environment of the installation by a watertight housing.

Another object of the invention is to provide a grounding device which, when installed adjacent the terminal end of a shielded high voltage power cable of the type having a metallic tape shield, will effectively terminate the tape shield and will serve as an adaptor for facilitating the employment of a shielded connector or terminator at the terminal end of the cable.

The above objects, as well as still further objects and advantages, are attained by the invention which may be described briefly as a shielding tape grounding device for use in connection with a shielded high voltage power cable of the type having an inner conductor, insulation surrounding the conductor, a shielding system including a metallic tape shield surrounding the insulation, and an outer jacket surrounding the metallic tape shield, the grounding device comprising an annular clamping means having an axial bore and including an inner surface portion with an internal diameter substantially greater than the external diameter of the metallic tape shield, electrical contact means including a band of conductive material juxtaposed with the inner surface portion and extending circumferentially around at least a portion of the outer periphery of the metallic tape shield, means for contracting the clamping means such that contraction of the clamping means will contract the band radially into effective electrical contact with a bared portion of the metallic tape shield when the clamping means is located on the cable with the band around the bared portion, flexure means between the inside diameter of the band and the inner surface portion of the clamping means for enabling resilient flexure of the band in a radial direction relative to the clamping means and/or the metallic tape shield, and a grounding conductor electrically connected to the band and extending radially outwardly beyond the clamping means.

The invention will be more fully understood, while still further objects and advantages will be made apparent, in the following detailed description of preferred embodiments of the invention illustrated in the accompanying drawing, in which:

FIG. 1 is a plan view illustrating the employment of two grounding devices constructed in accordance with the invention in conjunction with an electrical connection made between the terminal ends of a pair of shielded high voltage electrical cables, the grounding devices being turned 90° relative to one another to illustrate them in both plan and elevation;

FIG. 2 is an enlarged cross-sectional view taken along line 2—2 of FIG. 1;

FIG. 6 is a longitudinal cross-sectional view of another grounding device constructed in accordance with the invention and employed in conjunction with an electrical connector; and FIG. 7 is a cross-sectional view taken along line 7—7 of FIG. 6.

Figure 3:
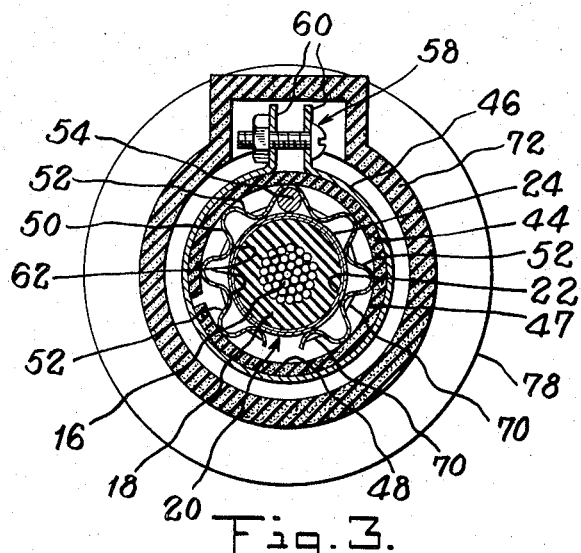
FIG. 3 is a cross-sectional view taken along line 3—3 of FIG. 2.

Referring now to the drawing, and especially to FIG. 1 thereof, there is illustrated a pair of high voltage shielded electrical cables 10 and 12 which are connected together mechanically as well as electrically by means of an electrical connector 14 and which form a part of an underground power distribution system. As best seen in FIG. 2, the cables 10 and 12 are of the type having a central conductor 16 surrounded by insulation 18 which is, in turn, surrounded by a shielding system 20 including a shielding bedding tape 22 and a metallic shielding tape 24. The shielding system 20 is surrounded by a protective outer jacket 26 which is usually constructed of an extruded synthetic resin or an elastomer and, in some instances, is fabricated of a conductive elastomer.

The connector 14 is of the type having a pair of mating composite housings 28 and 30 (see FIG. 1), each housing having an outer member 32 of electrically conductive elastomeric material and an integral inner member 34 of an insulating elastomeric material. The inner member 34 is made to grip the insulation 18 of the cable while the outer member 32 includes a portion 36 for gripping and making electrical contact with the shielding system 20 of the cable. Also included within the connector 14 (but not illustrated) is an electrical contact member which interconnects the conductors 16 of the cables within the connector. The outer members 32 of the composite housings 28 and 30 are interconnected so as to provide a continuous shield along the connector 14 between the terminated shielding systems 20 of the cables 10 and 12. However, it is not desirable that the shielding systems 20 be grounded through the shield provided by the conductive elastomer of the outer members 32 of the composite housings. Therefore, it becomes necessary to accommodate the current which might appear in the shielding systems of the cables 10 and 12 in some other manner.

In order to accommodate the current-carrying capacity of the shielding system 20 of each cable 10 and 12, a grounding device 40 constructed in accordance with the invention is adapted to engage a bared portion 42 of the metallic shielding tape 24 of the shielding system 20 in each cable 10 and 12. As best seen in FIGS. 2 and 3, the grounding device 40 has an annular clamping means shown in the form of a sleeve 44 of elastomeric material and a strap 46 extending around the exterior of the sleeve. The sleeve 44 has an axial bore 47 which defines an inner surface portion 48 having an internal diameter substantially greater than the external diameter of the metallic shielding tape 24. An electrical contact shown in the form of a band 50 of conductive material is juxtaposed with respect to the inner surface portion 48 within axial bore 47 of the sleeve 44 and extends circumferentially around at least a part of the outer periphery of the metallic tape shield 24 and preferably around the greatest part of the metallic tape shield's outer periphery as seen in FIG. 3. The band 50 is preferably fabricated of a copper strip and is provided with flexure means illustrated in the form of a series of axially extending groove-forming undulations or corrugations 52 which enable the band to flex resiliently in a radial direction relative to both the strap 46 and the outer periphery of the metallic tape shield 24 for purposes which will be described more fully hereinafter. A grounding conductor shown in the form of a grounding rod 54, preferably a copper rod, having a pair of remotely disposed ends is affixed to the band 50, preferably by seating one end of the grounding rod within a groove or corrugation in the band and by brazing or soldering the seated end as at 56.

Preferably, the inside diameter of the corrugated band 50 is slightly larger than the outside diameter of the bared portion 42 of the metallic shielding tape 24, but the band 50 may be contracted selectively and have its inside diameter decreased by means which will circumferentially contract the strap 46 extending around the outside of the sleeve 44 at the axial location where the strap 46 is circumjacent with respect to the band 50 as shown, for example, in FIG. 2. The strap 46 may be contracted circumferentially, and radially, by tightening a screw and nut assembly 58 which passes through a pair of ears 60 appended to the strap 46. Such contraction of the strap 46 will contract or constrict the band 50 and radially urge the axially extending contact peaks 62 formed between each pair of adjacent grooves or corrugations 52 into engagement with the bared portion 42 of the metallic tape shield 24. In addition, as will appear obvious from FIG. 3, the corrugations 52 in the band 50 will also permit the band to flex circumferentially, that is, upon contraction or constriction of the band 50 the latter will elongate slightly in the circumferential direction relative to the outer periphery of the bare portion 42 of the metallic tape shield 24.

Figure 4:
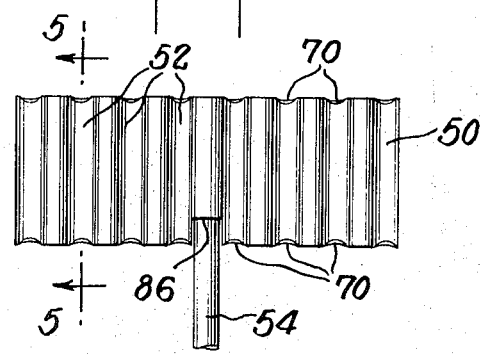
FIG. 4 is a plan view of a corrugated band employed in a grounding device constructed in accordance with the invention, the band lying flat for illustrative purposes.
Figure 5:
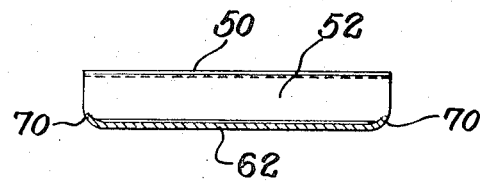
FIG. 5 is an enlarged cross-sectional view taken along line 5—5 of FIG. 4.

The construction of the band 50 is more fully illustrated in FIGS. 4 and 5. The flexure means provided in the band 50 by the grooves or corrugations 52 which extend radially between the inside diameter of the band and the inner surface portion 48 defined by the axial bore 47 and axially with respect to the cables 10, 12, enable the band to accommodate various cable size ranges by virtue of the radial flexibility imparted by the corrugations. Such flexibility is advantageous too in permitting band 50 to adjust itself to dimensional variations caused by varying thermal conditions while still maintaining a relatively constant contact pressure between the band and the bared portion 42 of the metallic shielding tape 24. In addition, the radial flexibility, as provided by the corrugations 52, will not affect the contact area between the band 50 and the shield 24 since the contact peaks 62 of the corrugations 52 will tend to remain seated upon the bared portion 42 despite radial flexing of the band. Finally, as shown in FIGS. 2 and 3, the radial flexibility of the band 50 due to its corrugated construction readily permits the seated end of the grounding rod to be radially displaced into direct contact with the outer surface of the metallic shielding tape 24 when the screw and nut assembly 58 is tightened and the strap 46 and the band 50 contracted as hereinabove described. The eleastomeric sleeve 44 serves as a cushion which supplements the corrugations 52 in maintaining an adequate clamping force between the band 50 and the metallic shielding tape 24 upon variations in size of the cable due to varying thermal conditions.

In addition to the mechanical flexibility imparted by the employment of axial corrugations 52, the axial corrugations 52 provide the band 50 with a configuration which utilizes an increased amount of metal over and above that amount which actually contacts the metallic shielding tape 24, thus enabling the band 50 to serve as a heat sink for conducting heat away from the bared portion of the metallic shielding tape 24 and increasing the current-carrying capacity of the metallic shielding tape 24 at the bared portion thereof. Sleeve 44 is also preferably fabricated of a conductive material.

In order to install the grounding device 40 adjacent the terminus of cable 10 or 12, the cable is first prepared by removing an end portion of the outer jacket 26 so that the outer jacket will terminate at 64 and the metallic shielding tape 24 of the shielding system 20 will be exposed beyond the terminal end 64 of the outer jacket. An end portion of the metallic shielding tape 24, together with a corresponding portion of the shielding bedding tape 22, are then removed to expose the insulation 18 and the shielding system 20 is made to terminate at 66. The terminal end 66 of the shielding system 20 is then preferably anchored to the insulation 18 by a coil 68 of adhesive tape, such as ordinary electrical tape, and the grounding device 40 is slipped over the terminus of the cable and into position over the bared portion 42 of the metallic shielding tape 24, as illustrated in FIG. 2. During such installation, the strap 46 is either removed from the sleeve 44 or is merely loosely held upon the sleeve so that the band 50 is relaxed and has an internal diameter great enough to pass over the metallic shielding tape 24 without disturbing the shielding tape. In order to facilitate such passage and preclude any snagging of the metallic shielding tape 24 by the band 50, the end edges 70 of the contact peaks 62 of the corrugations 52 are provided with a slight radius (see FIG. 5).

The screw and nut assembly 58 may then be tightened to contract the strap 46 and draw the band 50 against the bared portion 42 of the metallic shielding tape 24, thereby establishing an electrical connection of high current capacity between the band and the metallic shielding tape and consequently between the grounding rod 54 and the shielding system 20. Thus, grounding device 40 enables the shielding system 20 to be terminated with a ground connection having a current-carrying capacity which matches the capacity of the shielding system itself.

In order to protect the internal connection of the grounding device 40, as well as the bared portion 42 of the shield system 20, from corrosive elements in the vicinity of the installation, a housing 72 is fitted over the internal connection of the grounding device. The housing 72 is constructed of an elastomeric material, preferably electrically conductive, and includes at one end thereof a first end portion 74 having an internal bore 76 with an internal diameter which is normally slightly smaller than the external diameter of the outer jacket 26 such that the internal bore 76 must be resiliently dilated to receive the outer jacket 26 and will engage and grip the outer jacket in watertight relationship therewith when the housing 72 is in place, as shown in FIG. 2. At the other end of the housing 72 is a portion 78 having an internal bore 80 with an internal diameter which is normally slightly smaller than the external diameter of the corresponding end portion 82 of the electrical connector 14 so that this further internal bore 80 must be resiliently dilated to receive the end portion 82 of the electrical connector 14 and will engage and grip the end portion 82 in watertight relationship therewith to seal the interior of the housing 72 against corrosive elements. The grounding rod 54 extends through an exit aperture or collar 84 communicating with the interior of housing 72 which collar likewise grips the grounding rod in watertight relationship to enable the rod 54 to pass out of the housing 72 while maintaining the integrity of the sealed interior of the housing.

In the installation of the grounding device 40, the housing 72 is first slipped over the cable well beyond the terminal end of the ofthe outer jacket 26 and prior to installation of the band 50 with the projecting grounding rod 54. The grounding rod 54 projects at an angle away from the terminus of the cable 10 and toward the housing 72 which has been previously placed over the cable so that upon completion of the installation of the band 50 upon the bared portion 42 of the metallic shielding tape 24, the housing 72 may be pulled forward and the projecting end of the grounding rod 54 may be passed through the exit aperture or collar 84 to enable proper location of the housing 72 without interference from the grounding rod 54. It is noted that since the installed corrugated band 50 serves as a heat sink for the bared portion 42 of the shielding system 20 in place of the heat sink previously provided by the outer jacket 26, it is desirable to locate the corrugated band 50 in close proximity with the terminal end 64 of the outer jacket 26 so as to reduce any tendency for heat to build up in a current-carrying length of bared metallic shielding tape 24. In order to enable the corrugated band 50 to be placed in close proximity to the terminal end 64 of the outer jacket 26, the band 50 is notched at 86 (also see FIG. 4) to enable the grounding rod 54 to project from the band 50 at a desired angle without interfering with the desired location of the band relative to the terminal end of the outer jacket.

Turning now to the alternate embodiment illustrated in FIGS. 6 and 7, there is again illustrated a high voltage shielded electrical cable 100 of the type having a central conductor 102, insulation 104 surrounding the conductor, a shielding system 106 surrounding the insulation 104 and including a shielding bedding tape 108 surrounded by a metallic shielding tape 110, and an outer jacket 112 of an extruded synthetic resin or an elastomeric material surrounding the shielding system.

Cable 100 is also a part of an underground power distribution system but, in this instance, cable 100 is terminated with an electrical connector 114 of the type which ordinarily would be installed at the terminus of a shielded cable of the concentric neutral type in which the shielding system of the cable includes an external outer jacket of conductive elastomeric material. Thus, as best seen in FIG. 6, the electrical connector 114 has a composite housing 116 which includes an inner member 118 of insulating elastomeric material and an outer member 120 of conductive elastomeric material, and at the rearward end of the connector 114, the outer member 120 is provided with an inner axial bore portion 122 having an inside diameter which ordinarily would correspond go the outside diameter of the conductive elastomeric shield of such a concentric neutral cable in order to engage and grip the shield and make electrical contact therewith so as to preserve the electrical continuity of the shield and continue the shield along the length of the connector. However, cable 100 is not such a cable in that cable 100 employs a shielding system 106 which includes a metallic shielding tape 110. In order to enable the connector 114 to be installed properly at the terminus of cable 100, the shielding system 106 must be terminated in an effective manner. The effective termination of the shielding system 106 is accomplished through utilization of another embodiment of the invention illustrated in the form of grounding device 130, in this instance the grounding device also serving as an adaptor.

Referring now to both FIGS. 6 and 7, the grounding device 130 has an outer housing in the form of a sleeve 132 of electrically conductive elastomeric material. The axial bore 134 of the sleeve 132 defines an intermediate inner surface portion 136 whichis recessed with respect to a forward end inner surface portion 138 and a rearward end inner surface portion 140 to provide an internal diameter which is substantially larger than the outside diameter of the bared portion 142 of the metallic shielding tape 110 over which the grounding device 130 has been fitted. An electrical contact in the form of a band 144 of conductive material is seated within the recessed surface portion 136 of the axial bore 134 and extends circumferentially around at least a part of the outer periphery of the metallic shielding tape 110, and preferably around the greatest part of the metallic shielding tape's outer periphery, as seen in FIG. 7. The band 144 is preferably fabricated of a copper strip and is provided with a flexure means illustrated in the form of a series of axially extending groove-forming undulations or corrugations 146 which enable the band to flex resiliently in a radial direction for purposes which have already been explained above in connection with the earlier described embodiment. A grounding conductor shown in the form of a grounding rod 148, preferably a copper rod, has one of its ends seated within a groove or corrugation 146 and is affixed to the band 144, by brazing or soldering at 150, and has its other end extending through an exit aperture or collar 152 in sleeve 132 to project radially beyond the sleeve.

Preferably, the inside diameter of the undulated or corrugated band 144 is slightly larger than the outside diameter of the bared portion 142 of the metallic shielding tape 110, but the band may be contracted selectively and have its inside diameter decreased by a strap 154 which extends around the outside of the sleeve 132 at an axial location where the strap 154 is circumjacent with respect to the band 144. The strap 154 may be contracted circumferentially, and radially, by tightening a screw and nut assembly 156 which passes through a pair of ears 158 appended to the strap. Such contraction of the strap 154 will contract or constrict the band 144 and will radially urge the axially extending contact peaks 160 of the corrugations 146 into engagement with the bared portion 142 of the metallic shielding tape 110.

In order to install the connector 114 at the terminus of cable 100, the cable is first prepared by removing an end portion of the outer jacket 112 so that the outer jacket will terminate at 162 and the shielding system 106 will be exposed beyond the terminal end 162 of the outer jacket. An end portion of the shielding system 106 is then removed to expose the insulation 104 and the shielding system 106 is made to terminate at 166. The terminal end 166 of the shielding system 106 is then preferably anchored to the insulation 104 by a coil 168 of adhesive tape, such as ordinary electrical tape, and the grounding device 130 is slipped over the terminus of the cable and into position over the bared portion 142 of the shielding system 106, as illustrated in FIG. 6. During such installation, the strap 154 is either removed from the sleeve 132 or is merely loosely held upon the sleeve so that the band 144 is relaxed and has an internal diameter great enough to pass over the metallic shielding tape 110 without disturbing the shielding tape. In order to facilitate such passage and preclude any snagging of the metallic shielding tape 110 by the band 144, the end edges 170 of the contact peaks 160 of corrugations 146 are provided with a slight radius.

When the sleeve 132 is advanced into proper position upon the cable 100, as seen in FIG. 6, the forward end of the sleeve will overlap the outer jacket 112 and the inner surface portion 138 will be resiliently dilated to grip the outer jacket in watertight relationship therewith. At the same time, the rearward end of the sleeve will overlap the insulation 104 and the inner surface portion 140 will be resiliently dilated to grip the insulation in watertight relationship therewith. The exit aperture or collar 152 also grips the grounding rod 148 to effect a water seal where the grounding rod passes through the sleeve 132 so that the band 144 and the bared portion 142 of the shielding system 106 are sealed against corrosive elements outside the sleeve.

The screw and nut assembly 156 may then be tightened to contract the strap 154 and radially displace the band 144 against the bared portion 142 of the metallic shielding tape 110, thereby establishing an electrical connection of high current capacity between the band and the metallic shielding tape and consequently between the grounding rod 148 and the shielding system 106. Thus, the grounding device 130 enables the shielding system 106 to be terminated with a ground connection having a current-carrying capacity which matches the capacity of the shielding system itself.

In order to complete the electrical continuity of the shield between the cable 100 and the electrical connector 114, the rearward end of the sleeve 132 is provided with an outer surface portion 172 having a diameter corresponding to the inside diameter of the inner axial bore portion 122 of the outer member 120 of the electrical connector 114 so that upon completion of the installation of the grounding device 130, the electrical connector 114 may be installed at the terminus of cable 100 with the inner bore portion 122 gripping the outer surface portion 172 of the grounding device 130 and the shield provided by the shielding system 106 is continued through the sleeve 132 to the outer member 120. Thus, the grounding device 130 not only terminates the shielding system 106 but serves as an adaptor enabling the electrical connector 114 to be employed in connection with cable 100 rather than with a concentric neutral cable.

It will be apparent that grounding devices constructed in accordance with the invention may be fabricated entirely in the factory and installed in the field without the necessity for soldering or complex taping in the field. The grounding devices have a current-carrying capacity akin to the current-carrying capacity of the shielding systems of the cables upon which they are installed since the configuration of the electrical contact band employed in these grounding devices provides both an effective, well-maintained electrical connection with the shielding systems and a capacity for conducting heat from the shielding systems to which they are affixed. The grounding devices are readily applied to a wide variety of cable sizes and enhance the value of currently available connectors and terminators.

It is to be understood that the above detailed description of preferred embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. A shielding tape grounding device for use in connection with a shielded high voltage power cable of the type having an inner conductor, insulation surrounding the conductor, a shielding system including a metallic tape shield surrounding the insulation, and an outer jacket surrounding the metallic tape shield, said grounding device comprising:
    clamping means, said clamping means including a sleeve of elastomeric material defining an inner surface portion with an internal diameter substantially greater than the external diameter of the metallic shield, said clamping means including means selectively operable for decreasing the internal diameter of said inner surface portion;
    electrical contact means including a band of conductive material disposed within said elastomeric sleeve in juxtaposed relation to said inner surface portion, said band being adapted to extend circumferentially around at least a portion of a bared portion of said metallic tape shield, said electrical contact means having flexure means for enabling resilient flexure of at least a portion of the band in a radial direction relative to said bared portion of said metallic tape shield in response to a decrease in the internal diameter of said inner surface portion by the action of said selectively operable means whereby said at least portion of said band is adapted to resiliently engage said metallic tape shield when said grounding device is located on said cable with said band extending circumferentially around said at least portion of said metallic tape shield; and
    a grounding conductor electrically connected to the band and adapted to extend radially outward beyond the clamping means when said grounding device is located on said cable as hereinaforesaid.

2. The grounding device of claim 1 wherein said means for selectively decreasing the internal diameter of said inner surface portion comprises a circumferentially contractable clamp member disposed around the exterior surface of the sleeve, said clamp member being located at least at the axial location of the band when said grounding device is located on said cable.

3. The grounding device of claim 2 wherein the material of said sleeve is a conductive elastomer.

4. The grounding device of claim 2 wherein said flexure means include a plurality of axially extending corrugations in said band, said corrugations defining a first plurality of contact peaks adapted for resilient engagement with said inner surface portion and a second plurality of contact peaks adapted for resilient engagement with said metallic shield when said grounding device is locatedon said cable, said second plurality of contact peaks comprising said at least portion of the band.

5. The grounding device of claim 1 wherein said sleeve of elastomeric material includes an end portion extending axially beyond the band and the clamping means, said end portion of the sleeve having an opening therein, the relative normal diameters of said opening in said end portion of the sleeve and the outer jacket of the cable being such that the end portion of the sleeve must be resiliently dilated to receive the outer jacket and will engage and grip the outer jacket in watertight relationship therewith when the grounding device is located on said cable.

6. The grounding device of claim 5 wherein the sleeve is constructed of an electrically conductive elastomeric material.

7. The grounding device of claim 5 wherein said sleeve includes a second end portion oppositely disposed with respect to said first end portion, said second end portion extending axially beyond the band and the clamping means and having a further opening therein the relative normal diameters of the further opening and the insulation of the cable being such that the second end portion must be resiliently dilated to receive the insulation and will engage and grip the insulation in watertight relationship therewith when the grounding device is located on said cable.

8. The grounding device of claim 7 wherein the elastomeric sleeve is of electrically conductive material and includes an outer surface adjacent to the second end portion thereof for cooperatively engaging and making electrical contact with a corresponding bore portion in the shield of a shielded terminator or connector to electrically connect the shield of said terminator or connector with the shielding system of the cable.

9. The grounding device of claim 1 including a housing of elastomeric material surrounding at least said band when the grounding device is located on said cable, said housing including:
    opposite first and second ends;
    a first end portion extending axially beyond the band and the annular clamping means toward one end of the housing; and
    a second end portion extending axially beyond the band and the annular clamping means toward the other end of the housing;
    a first through opening within said first end portion, the relative normal diameters of the first through opening and the outer jacket of the cable being such that the first end portion must be resiliently dilated to receive the outer jacket of the cable and will engage and grip the outer jacket in watertight relationship therewith, and a second through opening within the second end portion, the relative normal diameters of the second end portion and a corresponding outer surface of a shielded electrical connector or terminator affixed to the cable adjacent said second end of said housing being such that the second end portion must be resiliently dilated to receive said corresponding surface and will engage and grip said corresponding surface in watertight relationship therewith.

10. The grounding device of claim 9 wherein the housing is constructed of an electrically conductive material and provides electrical continuity between the jacket and the corresponding outer surface of the shielded electrical connector or terminator.

11. Apparatus for use in connection with a shielded high voltage power cable of the type having an inner conductor, insulation surrounding the conductor, a shielding system including a metallic tape shield surrounding the insulation, and an outer jacket surrounding the metallic tape shield, said apparatus comprising:

electrical contact means including a band of conductive material adapted to surround said metallic tape shield along at least a portion of the circumferential extent of the metallic tape shield's outer periphery when a portion of said outer jacket has been removed to expose said metallic tape shield, said electrical contact means having means for enabling resilient flexure of at least a portion of said band in both a radial and a circumferential direction relative to the outer periphery of said metallic tape shield when said contact means is disposed on said cable in position to circumferentially surround at least a portion of the metallic tape shield's outer periphery, adjustable means surrounding said electrical contact means for selectively applying a force to said electrical contact means whereby said at least portion of said band is adapted to be radially and circumferentially displaced into effective electrical contact with the outer periphery of said metallic tape shield by the action of said adjustable means and grounding conductor means being electrically connected to said conductive band and extending radially outwardly beyond said adjustable force applying means whereby said grounding conductor means is adapted to be maintained in effective electrical contact with said metallic tape shield upon suitable adjustment of said adjustable force applying means.

12. The invention of claim 11 wherein said adjustable force applying means includes means for radially contracting and circumferentially elongating said band relative to said outer periphery of said metallic tape shield.

13. The invention of claim 12 wherein said grounding conductor means includes a pair of remotely disposed ends, one end of said grounding conductor means being disposed between said at least portion of said conductor band and said outer periphery of said metallic tape shield and being maintained in effective electrical contact with said metallic tape shield by the action of said radially contracting and circumferentially elongating means when said contact means is disposed on said cable as hereinaforesaid.

14. The invention of claim 13 wherein said at least portion of said conductive band includes at least one other portion displaced along the longitudinal extent of said band with respect to said one end of said grounding conducting means, said at least one other portion adapted to be maintained in effective electrical contact with said metallic tape shield by the action of said radially contracting means.

15. The apparatus of claim 12 wherein said radially contracting and circumferential elongating means includes a clamping member circumjacent to said electrical contact means at least at the axial location of said conductive band and includes adjustable means for constricting said clamping member relative to the outer periphery of said metallic tape shield when said contact means is disposed on said cable as hereinaforesaid.

16. The apparatus of claim 15 further including a housing member of elastomeric material, said housing member having a pair of oppositely disposed end portions and a central portion, the central portion of said housing being adapted to surround said electrical contact means and said adjustable means while one end portion of said housing is adapted to resiliently engage the outer jacket of said cable in watertight sealing relationship and the other end portion of said housing is adapted to engage in watertight sealing relationship a corresponding surface of a shielded electrical connector or terminator connected to said cable.

17. The apparatus of claim 16 wherein said central portion of said elastomeric housing includes an exit aperture communicating with the interior thereof, said grounding conductor means extending through and beyond said exit aperture, said exit aperture resiliently engaging said grounding conductor means in watertight sealing relationship therewith when said housing is located on said cable with its central portion surrounding said electrical contact means and said adjustable means.

18. The apparatus of claim 16 wherein said housing comprises conductive material and is capable of establishing effective electrical contact between said outer jacket of said cable and said corresponding surface of said shielded electrical connector or terminator when said housing is located on said cable with its central portion surrounding said electrical contact means and said adjustable means.

19. The apparatus of claim 11 further including an elastomeric sleeve disposed between said electrical contact means and said adjustable means at least at the axial location of said band.

20. The apparatus of claim 19 wherein sid elastomeric sleeve comprises conductive material.

21. The apparatus of claim 19 wherein said elastomeric sleeve includes a pair of oppositely disposed end portions extending axially beyond said conductive band respectively, one of said end portions being adapted to resiliently engage and grip the outer jacket of said cable in watertight sealing relationship and the other of said end portions being adapted to engage and grip the insulation of said cable in watertight sealing relationship and to engage the corresponding surface of a shielded electrical connector or terminator connected to said cable adjacent to said other end portion.

22. The apparatus of claim 21 wherein said elastomeric sleeve comprises conductive material and is capable of establishing effective electrical contact between said outer jacket of said cable and said corresponding surface of said shielded connector or terminator.

23. The apparatus of claim 21 wherein one of said oppositely disposed end portions of said sleeve has an inside diameter less than the outside diameter of said outer jacket and the other of said oppositely disposed end portions of said sleeve has an inside diameter less than the outside diameter of said insulation, said corresponding surface of said shielded electrical connector or terminator being defined by an axial bore being disposed in at least one end thereof, the diameter of said axial bore being less than the outside diameter of the other of said oppositely disposed end portions of said sleeve whereby said corresponding surface is resiliently dilatable for telescopic engagement with said other oppositely disposed end portion of said sleeve.

24. The apparatus of claim 23 wherein said outer jacket, said elastomeric sleeve, and said corresponding surface each comprise conductive material and said elastomeric sleeve serves as an adaptor between said shielded connector or terminator and said outer jacket by establishing effective electrical continuity between the outer jacket of said cable and the corresponding surface of said shielded connector or terminator.

25. The apparatus of claim 21 wherein said elastomeric sleeve further includes an exit collar situated between said end portions, said other end of said grounding conductor means extending through and beyond said exit collar, said exit collar resiliently engaging said grounding conductor means in watertight sealing relationship.

26. Apparatus for use in connection with a shielded high voltage power cable of the type having an inner conductor, insulation surrounding the conductor, a shielding system including a metallic tape shield surrounding the insulation, and an outer jacket surrounding the metallic tape shield, said apparatus comprising:

electrical contact means including a band of conductive material adapted to surround said metallic tape shield along at least a portion of the circumferential extent of the metallic tape shield's outer periphery when a portion of said outer jacket has been removed to expose said metallic tape shield, said electrical contact means having means for enabling resilient flexure of at least a portion of said band in a radial direction relative to the outer periphery of said metallic tape shield when said contact means is disposed on said cable in position to circumferentially surround at least a portion of the metallic tape shield's outer periphery;

adjustable means surrounding said electrical contact means for selectively applying a force to said electrical contact means whereby said at least portion of said band is adapted to be radially displaced into effective electrical contact with the outer periphery of said metallic tape shield by the action of said adjustable means, and;

grounding conductor means being electrically connected to said conductive band and extending radially outwardly beyond said force applying means;

wherein said flexure means includes a plurality of axially extending undulations disposed in said conductive band, said undulations defining a plurality of contact peaks adapted to engage said metallic tape shield and a plurality of alternately disposed grooved portions having their apexes radially displaced from said metallic tape shield whereby said at least portion of said conductive band comprises at least one of said groove portions and said band includes at least one other portion comprising at least one of said contact peaks.

27. The apparatus of claim 26 wherein said adjustable means comprises a clamping member circumjacent said electrical contact means at least at the axial location of said conductive band and includes means for constricting said clamping member relative to the outer periphery of said metallic tape shield whereby said at least one of said contact peaks is capable of being maintained in effective electrical contact with said metallic tape shield by the action of said adjustable means.

28. The apparatus of claim 27 further including an elastomeric sleeve surrounding said electrical contact means and being disposed between said conductive band and said clamping member at said at least axial location of said band.

29. The apparatus of claim 28 wherein said elastomeric sleeve comprises conductive material.

30. Apparatus for use in connection with a shielded high voltage power cable of the type having an inner conductor, insulation surrounding the conductor, a shielding system including a metallic tape shield surrounding the insulation, and an outer jacket surrounding the metallic tape shield, said apparatus comprising:

electrical contact means including a band of conductive material adapted to surround said metallic tape shield along at least a portion of the circumferential extent of the metallic tape shield's outer periphery when a portion of said outer jacket has been removed to expose said metallic tape shield, said electrical contact means having means for enabling resilient flexure of at least a portion of said band in a radial direction relative to the outer periphery of said metallic tape shield when said contact means is disposed on said cable in position to circumferentially surround at least a portion of the metallic tape shield's outer periphery;

adjustable means surrounding said electrical contact means for selectively applying a force to said electrical contact means whereby said at least portion of said band is adapted to be radially displaced into effective electrical contact with the outer periphery of said metallic tape shield by the action of said adjustable means, and;

grounding conductor means having a pair of remotely disposed ends, one of said ends being electrically connected to said conductive band and the other of said ends extending radially outwardly beyond said force applying means;

wherein said flexure means includes at least one axially extending undulation disposed in said conductive band, said undulation defining a grooved portion radially disposed from said metallic tape shield when said contact means is disposed on said cable as hereinaforesaid, said one end of said grounding conductor means being disposed in effective electrical contact with said band in the region of said grooved portion whereby the action of said adjustable means causes flexure of said grooved portion and displacement of said at least portion of said band in a radial direction relative to said metallic tape shield thereby bringing one end of said grounding conductor means into effective electrical contact with said metallic tape shield.

31. The apparatus of claim 30 wherein said one end of said grounding conductor means is connected to said conductive band within said grooved portion and is adapted to be maintained in contact with said metallic tape shield by the action of said adjustable means.

32. The apparatus of claim 30 wherein said adjustable means comprises a clamping member circumjacent to said electrical contact means at least at the axial location of said conductive band and includes means for constricting said clamping member relative to the outer periphery of said metallic tape shield whereby said at least portion of said band is capable of being maintained in effective electrical contact with said metallic tape shield upon flexure of said grooved portion by the action of said constricting means.

33. The apparatus of claim 30 further including an elastomeric sleeve surrounding said electrical contact means and being disposed between said conductive band and said adjustable means at least at the axial location of said band.

34. The apparatus of claim 33 wherein said elastomeric sleeve comprises conductive material.

35. For use in connection with a shielded high voltage power cable of the type having an inner conductor, insulation surrounding the conductor, a shielding system including a metallic tape shield surrounding the insulation, and an outer jacket surrounding the metallic tape shield, apparatus comprising:
an elastomeric sleeve, said sleeve being adapted to be disposed on said cable in position to enclose a bared portion of said metallic tape shield, said sleeve having at least one end portion adapted to resilient engage in watertight sealing relation the jacket substantially greater than the outside diameter of said metallic tape shield;
an electric contact member disposed within said sleeve and adapted to resiliently engage the outer periphery of said bared portion of said metallic tape shield when said sleeve is disposed about said cable in position to enclose said bared portion of said metallic tape shield;
a ground conductor electrically connected to said contact member within said sleeve, said sleeve including an aperture therein, said ground conductor extending through said aperture and beyond said sleeve, and;
a clamping member, said clamping member being adapted to maintain said contact member in resilient engagement with said metallic tape shield when said elastomeric sleeve is disposed on said cable as hereinaforesaid.

36. The apparatus of claim 35 wherein said aperture in said sleeve resiliently engages in watertight sealing relation said ground conductor.

37. The apparatus of claim 35 wherein said elastomeric sleeve includes another end portion oppositely disposed with respect to said one end portion, said another end portion being adapted to engage in watertight sealing relation the insulation on said cable when said sleeve is disposed on said cable in position to surround said bared portion of said metallic tape shield.

38. The apparatus of claim 37 wherein said sleeve comprises conductive material.

39. The apparatus of claim 52 wherein said elastomeric sleeve comprises a housing and includes another end portion oppositely disposed with respect to said one end portion, said another end portion being adapted to engage in watertight sealing relation a corresponding portion of a shielded electrical connector or terminator connected to said cable when said sleeve is disposed on said cable in position to enclose said bared portion of said metallic tape shield.

40. The apparatus of claim 39 wherein said sleeve comprises conductive material.

41. The apparatus of claim 39 further including a second elastomeric sleeve disposed within said housing and circumferentially extending about at least said contact member, said clamping member being disposed within said housing and circumferentially engaging said second elastomeric sleeve at least at the axial location of said contact member.

42. The apparatus of claim 35 wherein said clamping member circumferentially engages said elastomeric sleeve at least at the axial location of said contact member.

43. The apparatus of claim 35 wherein said contact member comprises a conductive band having a series of axially extending corrugations therein, said band extending circumferentially with respect to at least a portion of the interior surface of said elastomeric sleeve, said corrugations defining a plurality of circumferentially spaced apart contact peaks adapted to be resiliently engagable with said metallic tape shield when said sleeve is disposed on said cable as hereinaforesaid.

44. Apparatus for use in connection with a shielded high voltage power cable of the type having an inner conductor, insulation surrounding the conductor, a shielding system including a metallic tape shield surrounding the insulation, and an outer jacket surrounding the metallic tape shield, said apparatus comprising:
electrical contact means including a band of conductive material adapted to engage said metallic tape shield along at least a portion of the circumferential extent of the metallic tape shield's outer periphery when a portion of said outer jacket has been removed to expose said metallic tape shield;
adjustable means surrounding said electrical contact means for selectively applying a force to said electrical contact means such that at least a portion of said band is adapted to be maintained in effective electrical contact with the outer periphery of said metallic tape shield by the action of said adjustable means;
said electrical contact means having means for enabling resilient flexure of at least a portion of said band relative to the outer periphery of said metallic tape shield, and the adjustable means when said contact means is disposed on said cable in position to circumferentially engage at least a portion of the metallic tape shield's outer periphery and said means for selectively applying a force has been sufficiently adjusted to maintain said at least portion of said band in effective electrical contact with said metallic tape shield, and;
grounding conductor means being electrically connected to said conductive band and extending radially outwardly beyond said adjustable force applying means whereby said grounding conductor means and said at least portion of said band are adapted to be maintained in effective electrical contact with said metallic tape shield.

45. For use in connection with a shielded high-voltage power cable of the type having an inner conductor, insulation surrounding the conductor, a shielding system including a metallic tape shield surrounding the insulation and an outer jacket surrounding the metallic tape shield, apparatus comprising:
an elastomeric sleeve, said sleeve being adapted to be disposed on said cable in position to enclose at least a bared portion of said metallic tape shield, said sleeve having one end portion adapted to resiliently engage in watertight sealing relation the jacket on said cable and having another end portion adapted to engage in watertight sealing relation insulation on said cable or a corresponding surface of a shielded electrical connector or terminator connected to said cable, said sleeve having an aperture disposed in the wall thereof between said end portions,
an electric contact member disposed within said sleeve for engaging said bared portion of said metallic tape shield when said sleeve is disposed on said cable in position to enclose said bared portion of said metallic tape shield; and a ground conductor electrically connected to said contact member within said sleeve and extending through said aperture in said sleeve and beyond said sleeve.

46. The apparatus of claim 45 wherein said elastomeric sleeve comprises conductive material.

47. The apparatus of claim 45 wherein said aperture in said sleeve resiliently engages said ground conductor.

* * * * *

UNITED STATES PATENT OFFICE
CERTIFICATE OF CORRECTION

Patent No. 3,777,050          Dated December 4, 1973

Inventor(s) Frank A. Silva

It is certified that error appears in the above-identified patent and that said Letters Patent are hereby corrected as shown below:

On cover page, under the heading Assignee; change "American" to
--Amerace--.
Column 1, line 4; correct spelling "Nol" to --No.--; line 44; after
"upon" insert --a--.
Column 2, line 27; delete "and".
Column 4, line 54; change "eleastomeric" to --elastomeric--.
Column 6, line 5; after "end" insert --64--; line 5; after "the"
(second occurrence) delete "ofthe".
Column 7, line 8; correct "whichis" to --which is--.
Column 9, Claim 4, line 62; correct "locatedon" to --located on--.
Column 12, Claim 20, line 31; correct spelling "sid" to --said--.
Column 15, Claim 35, line 15; change "resilient" to --resiliently--;
Claim 35, line 16; after "jacket" insert --of said cable,
said sleeve further having an internal diameter--; Claim 39,
line 46; change "52" to --35--.

Signed and sealed this 11th day of June 1974.

(SEAL)
Attest:

EDWARD M. FLETCHER, JR.
Attesting Officer

C. MARSHALL DANN
Commissioner of Patents